July 11, 1967 W. C. RUDD 3,330,306
METHOD AND APPARATUS FOR WELDING BARBS TO WIRE AND THE LIKE
Filed May 7, 1964 2 Sheets-Sheet 1
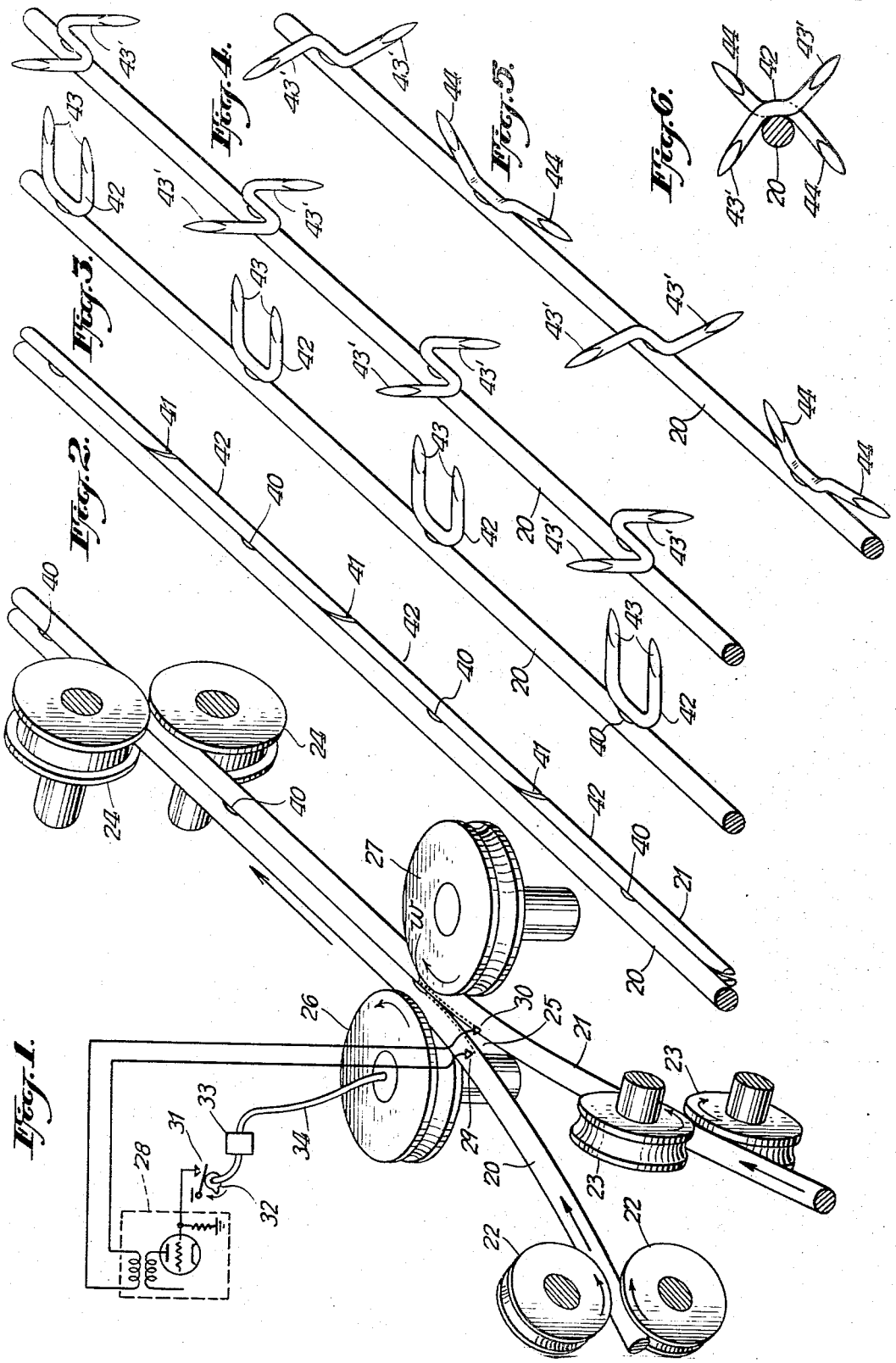

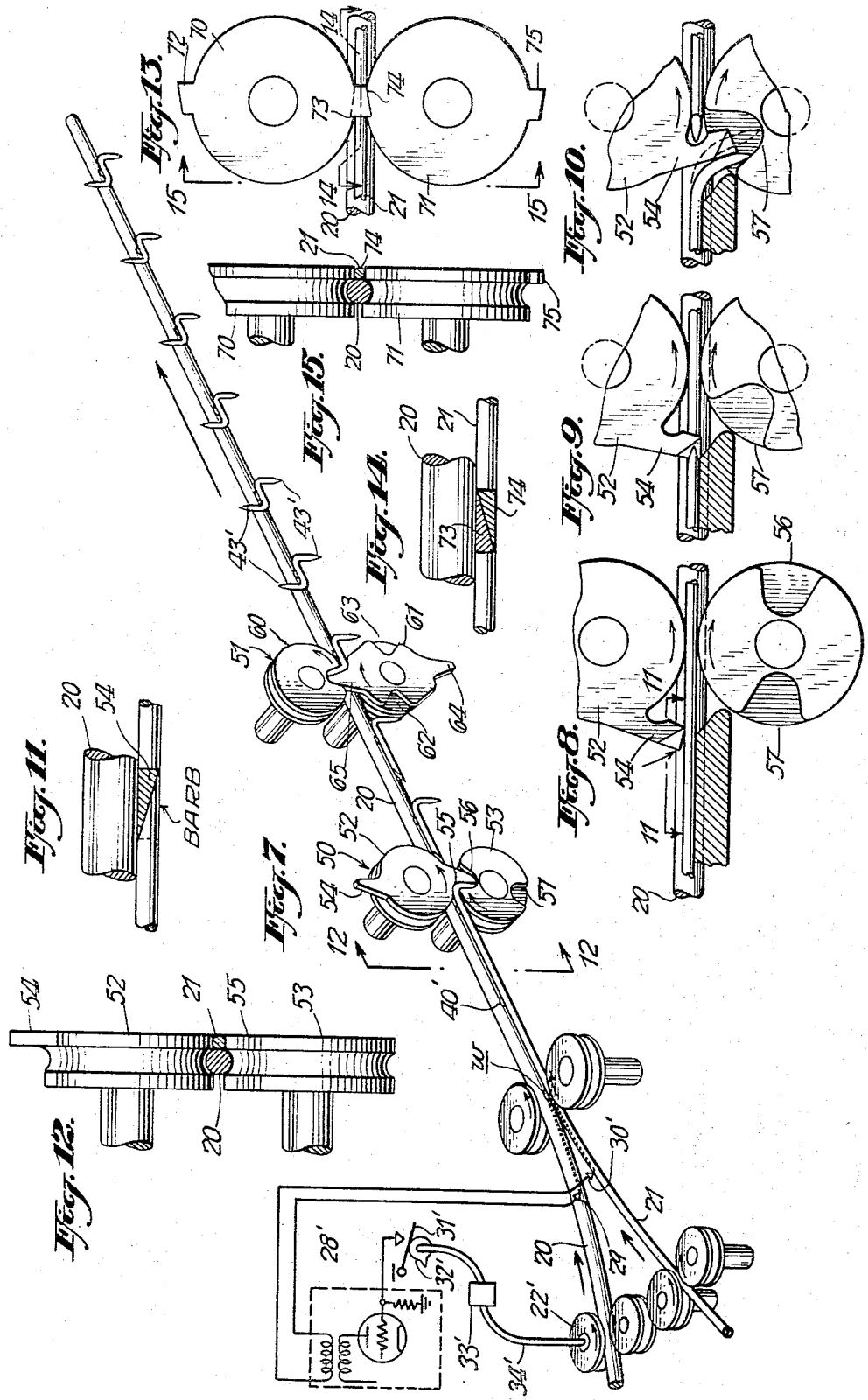

United States Patent Office
3,330,306
Patented July 11, 1967

3,330,306
METHOD AND APPARATUS FOR WELDING
BARBS TO WIRE AND THE LIKE
Wallace C. Rudd, Larchmont, N.Y., assignor to American
Machine & Foundry Company, New York, N.Y., a corporation of New Jersey
Filed May 7, 1964, Ser. No. 365,836
9 Claims. (Cl. 140—58)

This invention relates to a method and apparatus for welding barbs or the like to carrying means therefor, such as wire, to form so-called "barbed wire," although the invention is applicable to the production of similar products for various other possible uses.

So-called barbed wire is conventionally formed of a twisted pair of wires which comprise the carrying or supporting means for the barbs, the barbs being comprised of separate short lengths of wire with sharpened ends and coiled about one or both of the carrying wires and held against excessive slippage longitudinally of the carrying wires by reason of the fact that the latter are twisted. The present invention provides a method and apparatus for forming a relatively simplified and much less expensive form of barbed wire on which the barbs are each securely and permanently welded in place on a single strand of carrying wire. With the present invention, the barbs may be relatively closely spaced, if desired, or if preferred, they may be more widely spaced, since only one supporting wire need be used, and it is accordingly not necessary to space the barbs to correspond with any particular degree of twisting of the carrying wires as with conventional barbed wire. Furthermore, in accordance with the invention, it is unnecessary to wrap the wire-forming each barb about the carrying wire, and thus considerable saving in wire for forming the barbs is possible.

In order to form a product in accordance with the invention, a pair of wires or wire-like strands are rapidly advanced side by side past a weld point, where, at a succession of spaced-apart points, the two wires are welded together in accordance with the invention disclosed in the copending application of Wallace C. Rudd, Serial No. 358,447, filed April 9, 1964, entitled "High Frequency Welding and Shaping of Metal Parts." Thereafter one of the wire strands is cut apart at points preferably intermediate each two successive weld points, thereby providing a carrying wire with a succession of end-to-end barb elements welded thereto at successive points. Thereafter one or both ends of these barb elements are deflected in desired directions outwardly of the carrying wire or strand, thus completing the desired barbed wire product.

In said copending application, a pair of elongated members, such as wires which are to be welded together at spaced points, are rapidly advanced so as to come together under pressure at a weld point, while pulses of high frequency current are applied to the approaching surfaces respectively which are to be welded together, these pulses being so timed as to apply such current to flow on the opposed surfaces for a short distance in advance of each desired weld, the pulses each continuing for the short interval while the weld is being formed. Then the current is discontinued until the next succeeding weld is to be formed. This method of welding two strands together is particularly advantageous for the practice of the present invention, in that it provides welds of high quality at accurately predetermined spaced locations, and without danger of decreasing at the weld point in any way the strength of the wire which is to form the supporting strand. That is, by this method of forming the spaced-apart welds, only the very surface portions of the two strands which are to be welded together, become heated to actual welding temperature, and then only for the very brief interval while the weld location is passing the weld point, and without danger of heating the metal in depth beneath its surface to welding temperature or injuring or disturbing the crystalline structure of same. Yet at the places where the welds occur in each case, there will uniformly be a good forged type of weld.

Various further and more specific objects, features and advantages of the invention will appear from the description given below, taken in connection with the accompanying drawings, illustrating by way of example preferred forms of the invention.

In the drawings:
FIG. 1 is a somewhat schematic perspective view illustrating how two strands may be welded together at spaced points in the practice of the present invention;
FIG. 2 is a perspective view of the pair of strands after being welded at spaced points and after one of the strands has also been cut at spaced points to separate the strand into a succession of end-to-end barb elements, each welded to the carrying strand;
FIG. 3 is a view similar to FIG. 2, but showing the product after each barb has had its ends bent outwardly of the carrying strand;
FIGS. 4 and 5 are views similar to FIG. 3, but showing the barb ends deflected in various different possible positions;
FIG. 6 is a sectional view of one possible form of the product;
FIG. 7 is a view similar to FIG. 1, but showing a somewhat modified arrangement of the apparatus, including the means for welding the pair of strands together at spaced points, as well as mechanism for deflecting the barb ends;
FIGS. 8, 9 and 10 respectively are enlarged side views showing the operation of parts of the barb-deflecting mechanism in further detail;
FIG. 11 is a sectional view taken substantially along line 11–11 of FIG. 8;
FIG. 12 is a sectional elevational view taken substantially along line 12—12 of FIG. 7;
FIG. 13 is a side elevational view of an alternative form of mechanism for cutting apart the successive end-to-end barb elements;
FIG. 14 is a sectional view taken substantially along line 14—14 of FIG. 13; and
FIG. 15 is a sectional elevational view taken substantially along line 15—15 of FIG. 13.

Referring now to the drawings in further detail, there is shown in FIG. 1 a pair of strands, as at 20 and 21, which are being rapidly advanced past a weld point w as by the use of suitable pairs of rollers, as at 22—22, 23—23 and 24—24, some or all of which may be driven, as desired. The strands are preferably so guided and advanced that they will form together a V-shaped gap, as at 25, in advance of the weld point w, where they are brought together under pressure as by pressure rollers 26 and 27.

As disclosed in the above-mentioned co-pending application, current from any suitable form of high frequency source, such as an oscillator, as schematically indicated at 28, may be applied to contacts, 29 and 30, engaging the metal surfaces at opposite sides of the gap 25, so that the current therefrom flows to and from the weld point and results in heating the gap edge surfaces only up to welding temperature upon arrival at the weld point. The current is supplied in the form of successive pulses, each persisting only for the period necessary to heat the approaching edge surfaces to welding temperature by the time they reach the weld point and for the short interval thereafter while the small welded area is passing the weld point. As is also disclosed in said co-pending application, the pulses may be controlled by a switch, as at 31, for applying a blocking potential to the grid of the oscillator, this switch being controlled by cam 32, connected to suitable gearing as at 33, which in turn, by suitable mechanical connection 34, is connected to be driven preferably by one of the pressure rollers 26, the gearing being designed to so control the cam and switch 31, as to block the oscillator at intervals following the termination of each weld, and until the current is to be again applied for preheating and welding the metal for the next weld.

It will be understood that the two members 20 and 21, if desired, may be of different sizes or cross-sections and also, if desired, formed of different metals, particularly of different grades of steel, such that the member 20, for example, will have great tensile strength, whereas, if desired, the member 21 may be formed of a type of steel best adapted for forming rigid barbs with good cutting edges or points and of stainless steel, if preferred. Also, one or both of the strands may be formed of galvanized wire, and yet the welds may be effectively formed by the method above referred to, and after same are formed, they will be well protected electrolytically against corrosion by the presence of the zinc.

The strands 20 and 21 may be advanced very rapidly through the apparatus of FIG. 1, for example at speeds of some thirty feet per minute, but generally at much higher speeds.

After the strands have been welded together at spaced points, as indicated at 40, then one of the strands, preferably the smaller of the two strands 21, may be severed, as by punch cutting or other means, preferably angularly and at spaced locations, as indicated at 41, each of these cuts preferably being located midway between each pair of welds 40, as shown in FIG. 2. Thus there is here provided a carrying strand 20 with a succession of end-to-end barb elements 42 welded thereon.

As shown in FIG. 3, the prongs 43 at the respective ends of each barb element, have been deflected outwardly of the carrying strand 20 and all in one direction, as may be desired if the wire is to be secured to some structure, for example, which is to be protected to discourage birds or animals. Alternatively, if desired, the barb ends may be deflected in opposite directions, as at 43', as shown in FIG. 4. Furthermore, if preferred, alternative barbs may (as shown in FIG. 5) be deflected into positions transverse to the carrying strand, as at 43', whereas intervening barbs may be deflected angularly forwardly and rearwardly, as at 44. FIG. 6 is a sectional view of another possible example.

With the form of the invention shown in FIG. 7, the welding is accomplished by means generally similar to that shown in FIG. 1, corresponding parts being identified by the same reference numerals accompanied by prime marks. Here the pulses are controlled by drive means 34' connected to one of the feed rollers 22'. In this case, as well as in the case of FIG. 1, if preferred, high frequency current may be caused to flow on the advancing strands in advance of and at the weld point by alternative methods well known in the high frequency welding art.

As further shown in FIG. 7, the strands, after being welded at spaced points, as indicated at 40', may be advanced directly to mechanisms, as at 50 and 51, for deflecting the barbs. The mechanism 50, for example, may comprise a pair of elements 52, 53 rotated respectively in the directions indicated by the arrows by suitable drive means (not shown) and in timed relation to keep in phase with the high frequency welding pulses, and consequently in timed relation to the occurrence of the weld points 40' as they pass the mechanism 50. For example, the feed roller 20' and the drive connection 34' for controlling the oscillator pulses, may be suitably connected to be driven with a predetermined speed and phase relation to the drives for the barb-deflecting elements 52 and 53.

The barb-deflecting element 52 may be provided with barb-cutting and deflecting knives 54 and 55, located at diametrically opposite positions on the element 52. The rotating element 53 may be formed at diametrically opposite positions with cavity portions as at 56 and 57, which (as will be apparent from FIGS. 8, 9 and 10) provide cavities within which the cutters, such as at 54 and 55, may protrude as same cut and deflect succeeding barb prongs downwardly against rear wall portions of these cavities. As the carrying strand 20 advances rapidly with the barbs thereon, it will be apparent that the forward prong on each barb will be deflected downwardly, as shown in FIGS. 8, 9 and 10.

Subsequently the trailing prong on each barb will be deflected upwardly by the mechanism shown at 51 comprising an upper roller 60 for pressing down against the strand 20, and a rotating member 61 which presses upwardly against such strand. It will be understood that the mechanism at 51, as in the case of the mechanism at 50, is driven in properly timed relation by any suitable mechanical means (not shown) with respect to the positions of the successive barbs.

Member 61 (as shown) is formed at diagonally opposite positions with cavities, as at 62, 63, for affording clearance for the prongs which have been downwardly deflected at the mechanism 50. Also, mechanism 51 is formed at diametrically opposite positions with projections, as at 64, 65, which act to deflect the trailing end prongs of each barb upwardly, thus giving the product as shown with upwardly and downwardly projecting prongs 43'.

As an alternative, as shown in FIG. 13, the strands 20 and 21, after being welded at spaced points, may pass between a pair of upper and lower rotating members, as at 70, 71, each carrying at diametrically opposite positions severing knives, as at 72, 73, 74 and 75. This arrangement, if desired, may be placed in apparatus such as of either FIG. 1 or FIG. 7, just following the welding means, so as to sever the barb elements, as at 41 (FIG. 2). FIG. 15 is a vertical sectional view taken along line 15—15 of FIG. 13, showing the relative positions of the parts for this operation. FIG. 14 is a view showing in section the knives 73 and 74 as they are about to act conjointly to sever the strand 21 with a scissors-like cut.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for forming an elongated metal member with a succession of metal elements welded thereto at spaced predetermined positions, which method comprises: rapidly advancing said member together with another elongated metal member past a weld point while forcing said members together at said point; causing pulses of high frequency current to flow along on opposed surfaces of said members for a short distance in advance of said weld point; timing said pulses to occur when each of said spaced predetermined positions is approaching and passing said point, thereby heating the contacting surfaces of the members to welding temperature whereby same become welded at said spaced positions thereon; and thereafter severing said other member at intervals between the welds to divide same into said succession of elements, each welded to the first-named elongated member.

2. Method for forming an elongated metal member with a succession of metal elements protruding transversely thereof and welded thereto at spaced predetermined positions, which method comprises: rapidly advancing said member together with another elongated metal member past a weld point while forcing said members together at said point; causing pulses of high frequency current to flow along on opposed surfaces of said members for a short distance in advance of said weld point; timing said pulses to occur when each of said spaced predetermined positions is approaching and passing said point, thereby heating the contacting surfaces of the members to welding temperature whereby same become welded at said spaced positions thereon; thereafter severing said other member at intervals between the welds to divide same into said succession of elements, each welded to the first-named elongated member; and thereafter deflecting end portions of said elements transversely of said first-named member.

3. Method for forming barbed wire and the like having a succession of barbs welded in place at spaced predetermined positions, which method comprises: rapidly advancing a first metal strand, together with another metal strand, past a weld point while forcing said strands together at said point; causing pulses of heating current to flow on opposed surfaces of said strands at the region of said weld point; timing said pulses to occur when each of said spaced predetermined positions is approaching and passing said point, thereby heating the contacting surfaces of the strands to welding temperature whereby same become welded at said spaced positions thereon; thereafter severing said other strand at intervals between the welds to divide same into barb elements, each welded to the first-named strand; and deflecting end portions of said elements transversely of said first-named strand.

4. Method for forming barbed wire and the like having a succession of barbs welded in place at spaced predetermined positions, which method comprises: rapidly advancing a first metal strand, together with another metal strand past a weld point while forcing said strands together at said point; causing pulses of high frequency current to flow on opposed surfaces of said strands at the region of said weld point; timing said pulses to occur when each of said spaced predetermined positions is approaching and passing said point, thereby heating the contacting surfaces of the strands to welding temperature whereby same become welded at said spaced positions thereon; thereafter severing said other strand diagonally at intervals between the welds to divide same into a succession of barb elements with pointed ends, each welded to the first-named strand; and thereafter deflecting said ends with respect to said first-named element.

5. Method for forming barbed wire which comprises: welding together a pair of metal strands at predetermined spaced-apart points; severing one of said strands along diagonal lines at places located between said points thereby to form a succession of end-to-end pointed barb elements each welded to the other strand; and thereafter deflecting portions of such elements transversely of such other strand.

6. Apparatus for securing to an elongated metal member a succession of metal elements welded thereto at spaced predetermined positions, which comprises in combination: means for rapidly advancing said member together with another elongated metal member past a weld point; means for forcing said members together at said point; means for causing pulses of high frequency current to flow along on opposed surfaces of said members for a short distance in advance of said weld point; means for timing said pulses to occur when each of said spaced predetermined positions is approaching and passing said point, thereby heating the contacting surfaces of the members to welding temperature, whereby same become welded at said spaced positions thereon; and mechanism through which said members are further advanced, and which is operable in timed relation to said pulses for severing said other member at intervals between the welds to divide same into said succession of elements, each welded to the first-named elongated member.

7. Apparatus in accordance with the foregoing claim 6 and in which said severing mechanism also acts to deflect portions of said elements transversely of said first-named member.

8. Method for forming a product adapted to be used in the production of barbed wire, which comprises: welding together a pair of metal strands at predetermined spaced-apart points; severing one of said strands along diagonal lines at places located between said points thereby to form a succession of substantially end-to-end pointed barb elements each welded to the other strand, portions of said elements, however, being free to be deflected to positions transversely of such other strand to form protruding barbs.

9. A product adapted to be used for forming barbed wire and the like, said product comprising an elongated strand and another strand welded thereto at spaced-apart points, said other strand being substantially severed along diagonal lines at places located between said points, thereby providing a succession of substantially end-to-end pointed barb elements each welded to the first-named strand and each having portions free to be deflected transversely of the first-named strand to form protruding barbs.

References Cited
UNITED STATES PATENTS 2,308,905  1/1943  Abbott _____ 140—67 X
2,720,227  10/1955  Stadston _____ 140—58

WILLIAM J. STEPHENSON, *Primary Examiner.*